(12) United States Patent
Aksit et al.

(10) Patent No.: US 10,916,054 B2
(45) Date of Patent: Feb. 9, 2021

(54) THREE-DIMENSIONAL MESH DEFORMATION USING DEEP LEARNING NEURAL NETWORKS

(71) Applicant: Adobe Inc., San Jose, CA (US)

(72) Inventors: Duygu Ceylan Aksit, San Jose, CA (US); Weiyue Wang, Los Angeles, CA (US); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 75 days.

(21) Appl. No.: 16/184,149

(22) Filed: Nov. 8, 2018

(65) Prior Publication Data

US 2020/0151952 A1    May 14, 2020

(51) Int. Cl.
*G06T 17/20* (2006.01)
*G06N 3/08* (2006.01)
*G06N 3/04* (2006.01)

(52) U.S. Cl.
CPC .......... *G06T 17/20* (2013.01); *G06N 3/0454* (2013.01); *G06N 3/088* (2013.01)

(58) Field of Classification Search
CPC .......... G06T 2207/10028; G06T 13/40; G06T 2207/20081; G06T 3/0093; G06T 7/149; G06T 7/246; G06T 7/248; G06T 7/33; G06T 7/344; G06T 15/00; G06T 2207/20084; G06T 13/00; G06T 17/00
See application file for complete search history.

(56) References Cited

U.S. PATENT DOCUMENTS

| | | | | |
|---|---|---|---|---|
| 2008/0231640 | A1* | 9/2008 | Pighin | G06T 3/0093 |
| | | | | 345/619 |
| 2018/0293429 | A1* | 10/2018 | Wechsler | G06K 9/00288 |
| 2018/0360313 | A1* | 12/2018 | Zhang | A61B 5/004 |

OTHER PUBLICATIONS

Wang et al., Pixel2Mesh: Generating 3D Mesh Models from Single RGB Images, ECCV 2018. 16 pages, 2018. Downloaded from https://arxiv.org/pdf/1804.01654.pdf. (Year: 2018).*

Fan et al., "A Point Set Generation Network for 3D Object Reconstruction from a Single Image", arXiv:1612.00603v2, 12 pages (Dec. 7, 2016).

Groueix et al., "AtlasNet: A Papier-Mache Approach to Learning 3D Surface Generation", In Proceedings IEEE Conf. on Computer Vision and Pattern Recognition (CVPR), pp. 216-224 (2018).

(Continued)

*Primary Examiner* — Haixia Du
(74) *Attorney, Agent, or Firm* — Finch & Maloney PLLC

(57) ABSTRACT

Techniques are disclosed for deforming a 3D source mesh to resemble a target object representation which may be a 2D image or another 3D mesh. A methodology implementing the techniques according to an embodiment includes extracting a set of one or more source features from a source 3D mesh. The source 3D mesh includes a plurality of source points representing a source object, and the extracting of the set of source features is independent of an ordering of the source points. The method also includes extracting a set of one or more target features from the target object representation, and decoding a concatenation of the set of source features and the set of target features to predict vertex offsets for application to the source 3D mesh to generate a deformed 3D mesh based on the target object. The feature extractions and the vertex offset predictions may employ Deep Neural Networks.

20 Claims, 9 Drawing Sheets

(56) References Cited

OTHER PUBLICATIONS

He et al., "Deep Residual Learning for Image Recognition", arXiv:1512.03385v1, 12 pages (Dec. 10, 2015).
Huang et al., "Single-View Reconstruction via Joint Analysis of Image and Shape Collections", ACM Transactions on Graphics (TOG), 10 pages (2015).
Kanazawa et al., "Learning 3D Deformation of Animals from 2D Images", In Proceedings of EUROGRAPHICS/ACM SIGGRAPH Symposium on Geometry Processing, vol. 35, 10 pages (2016).
Kanazawa et al., "Learning Category-Specific Mesh Reconstruction from Image Collections", In ECCV, 16 pages (2018).
Kato et al., "Neural 3D Mesh Renderer", arXiv:1711.07566v1, 17 pages (Nov. 20, 2017).
Kurenkov et al., "Deformnet: Free-Form Deformation Network for 3D Shape Reconstruction from a Single Image", arXiv:1708.04672v1, 12 pages (Aug. 11, 2017).
Qi et al., "PointNet: Deep Learning on Point Sets for 3D Classification and Segmentation" arXiv:1612:00593v2, 19 pages (Apr. 10, 2017).
Wang et al., "Pixel2Mesh: Generating 3D Mesh Models from Single RGB Images", arXiv:1804.01654v2, 16 pages (Aug. 3, 2018).
Yumer et al., "Learning Semantic Deformation Flows with 3D Convolutional Networks", In European Conference on Computer Vision, pp. 294-311 (2016).

\* cited by examiner

Mesh
110, 120

Sample Point Cloud
202, 203

Point P and Vertices V of Enclosing Triangular Mesh
500

Deformation
700

Self-intersection in deformation
702

Employing Local Permutation Invariant Loss Function
704

THREE-DIMENSIONAL MESH DEFORMATION USING DEEP LEARNING NEURAL NETWORKS

FIELD OF THE DISCLOSURE

This disclosure relates to computer graphics techniques using deep learning. Particularly, this disclosure relates to techniques for deforming a three-dimensional (3D) source mesh to resemble a target object representation which may be a two-dimensional (2D) image or another 3D mesh.

BACKGROUND

Designers and artists often work with 3D meshes, also referred to herein as 3D models. A 3D mesh is a structural representation of an object based on polygons. 3D meshes use reference points, for example in an X, Y and Z coordinate system, to define shapes with height, width, and depth. Designers may utilize any number of existing 3D mesh databases, for example from publicly available online sources and stock sites, to search for 3D models that are reasonably close to their desired model. However, typically a designer will not be able to find a 3D mesh that exactly matches their needs or requirements. Instead, the designer may find a 3D mesh that is similar to what they have in mind, but which requires modification or additions so that it more closely resembles a specific desired image of an object. Such modifications often require artistic capability along with a high level of knowledge and expertise with specialized tools, and as such tend to be difficult, time consuming, and expensive. One possible solution to address this problem is a computer-based 3D modelling system that requires the user to supply annotated vertex correspondences between the existing mesh and the desired mesh, or that requires excessive computational preprocessing to compute those correspondences. Such computer-based systems further require large quantities of data for training which can be inconvenient and impractical in some situations, and even when trained, performance is not particularly good.

DETAILED DESCRIPTION

Figure 1:
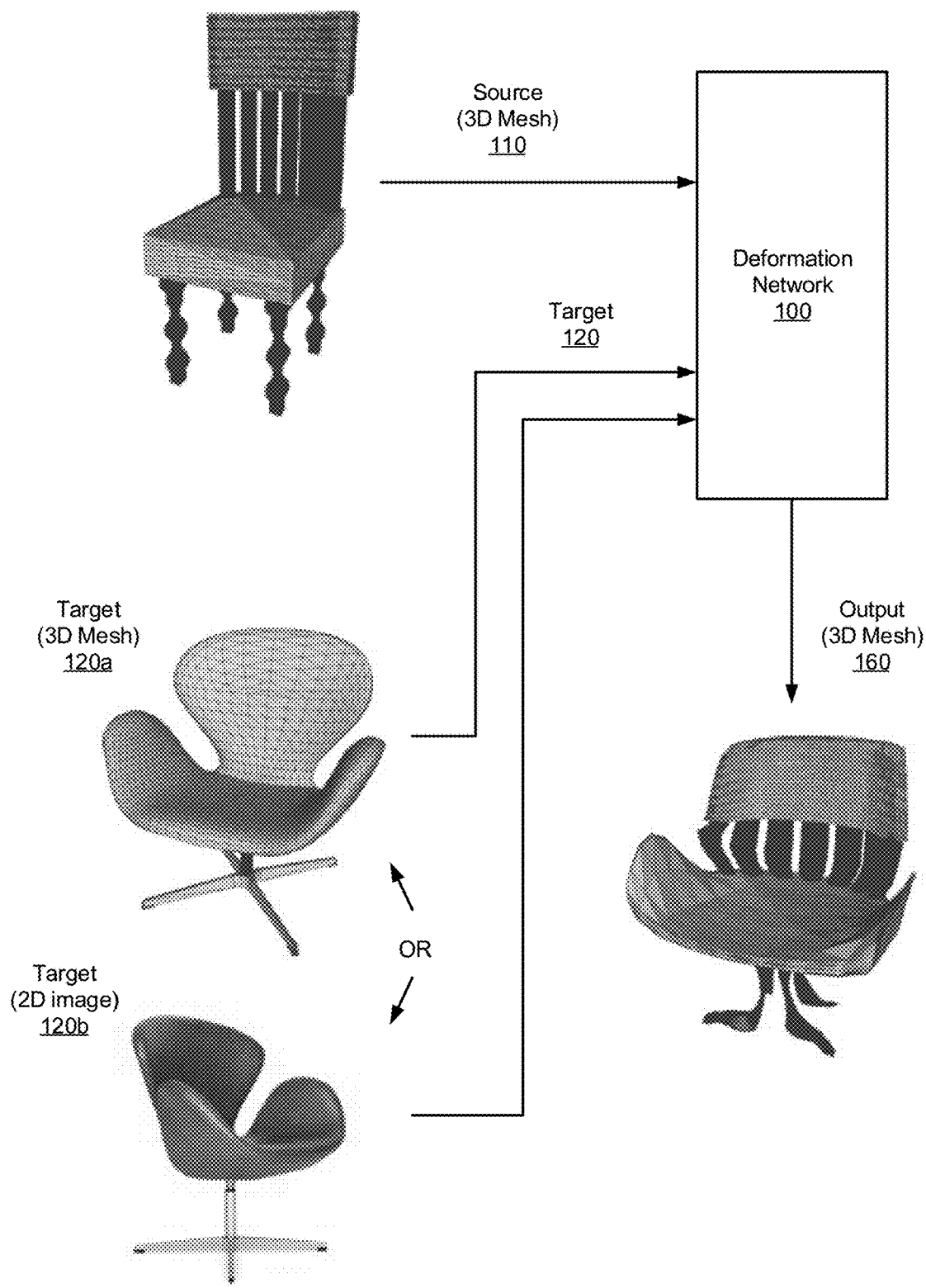
FIG. 1 illustrates the application of a deformation network to a source and a target object representation, in accordance with an embodiment of the present disclosure.

As noted previously, the modification of existing 3D mesh objects or models to render them suitable for a particular application, using existing techniques, can be difficult, time-consuming, and expensive, since the process generally involves extensive user interaction and/or complex computer-based systems that require large quantities of training data. Additionally, the performance of these existing techniques is often less than satisfactory. To this end, it would be desirable to have a system that is capable of deforming an existing 3D source mesh to resemble a desired target with minimal user input and supervision, and without the need for a large training database. The resulting deformed 3D mesh should be visually similar to the target mesh or target image and should also preserve the details of the source mesh to a high degree of fidelity.

To this end, the present disclosure provides an end-to-end Deep Neural Network (DNN) architecture configured to deform or morph a source 3D mesh (representative of a 3D object) to match one or more features of a target 3D object (or 2D image) representation by predicting per-vertex offsets to be applied to the source 3D mesh. In this way, a new 3D object can be programmatically created that is a hybrid of the source object and the target object, wherein the programmatic creation process allows for one or more properties of the source object to be preserved while further morphing that source object to have one or more properties of the target object. As will be appreciated, the newly created 3D object can then be, for example, used in a graphic arts project or stored in an object library or online repository that is accessible to artists and content creators, to name some example use cases. The architecture includes one or more deep learning networks that operate in an unsupervised training mode, which is to say that ground truth data is not required. In addition, the network(s) employ loss functions configured to provide distance minimization, smoothing, self-intersection avoidance, and detail preservation, as will be explained in greater detail below.

According to one example embodiment of the present disclosure, the architecture extracts a set of one or more source features from a source 3D mesh, the source 3D mesh including a plurality of source points representing a source object. Note that the extracting of the set of source features is independent of an ordering of the source points. The architecture further extracts a set of one or more target features from a representation of a target object. The target object representation may be, for instance, a target 3D mesh or a target 2D image. The architecture then decodes a concatenation of the set of source features and the set of target features. The decoding predicts vertex offsets for application to the source 3D mesh to generate a deformed 3D mesh based on the target object.

In some such embodiments, the extracting of the set of source features is performed by a first instance of a DNN generally referred to herein as a source encoder network, and the decoding to predict vertex offsets is performed by a second instance of the DNN generally referred to herein as an offset decoder network. In cases where the representation of the target object is a target 3D mesh including a plurality of target points, the extracting of the set of target features is performed by a third instance of the DNN generally referred to herein as a target encoder network. Note the extraction is independent of an ordering of the target points. In other cases where the representation of the target object is a target 2-dimensional (2D) image, the extracting of the set of target features is performed by a Convolutional Neural Network (also referred to herein as a target encoder network).

The decoding to predict vertex offsets may be carried out in a number of ways. For instance, in some embodiments this decoding includes calculating loss functions to minimize a distance between the representation of the source object and the representation of the target object. The loss functions include, for instance, a Chamfer distance function, an Earth Mover's distance function, a Silhouette Rendering loss function, or some combination of these loss functions. In other embodiments, the decoding includes calculating a Local Permutation Invariant loss on the deformed 3D mesh to smooth the deformed 3D mesh and reduce instances of self-intersection of the deformed 3D mesh. In still other embodiments, the decoding includes calculating a Mesh Laplacian loss between the source 3D mesh and the deformed 3D mesh to preserve details associated with the source 3D mesh.

FIG. 1 illustrates an example use case for the application of a deformation network to a source object representation based on a target object representation, in accordance with an embodiment of the present disclosure. The deformation network or system is applied to a 3D mesh representation 110 of a source object such as an item of furniture, for example, a chair. Continuing with this example, the deformation process proceeds by accepting another 3D mesh 120a (or 2D image 120b) of a different type of chair which represents the target 120 or goal that the designer is trying to achieve. The system generates vertex offsets which can be applied to the source 3D mesh 110 to deform the 3D mesh of the source chair to more closely resemble the shape of the target chair 120. The resulting deformed 3D mesh output 160 is a hybrid of the source and target objects which preserves the properties of the source object while morphing it into the shape of the target object.

Thus, the foregoing framework provides a tool to deform a 3D mesh to resemble a target object representation in a relatively efficient fashion with minimal user input or supervision, compared to existing techniques, using deep learning neural networks with novel loss functions configured to provide a deformed mesh that is visually similar to the target. The disclosed techniques improve efficiency, reduce production time, and lower the cost of 3D modelling. Numerous configurations and variations will be apparent in light of this disclosure

System Architecture

Figure 2:
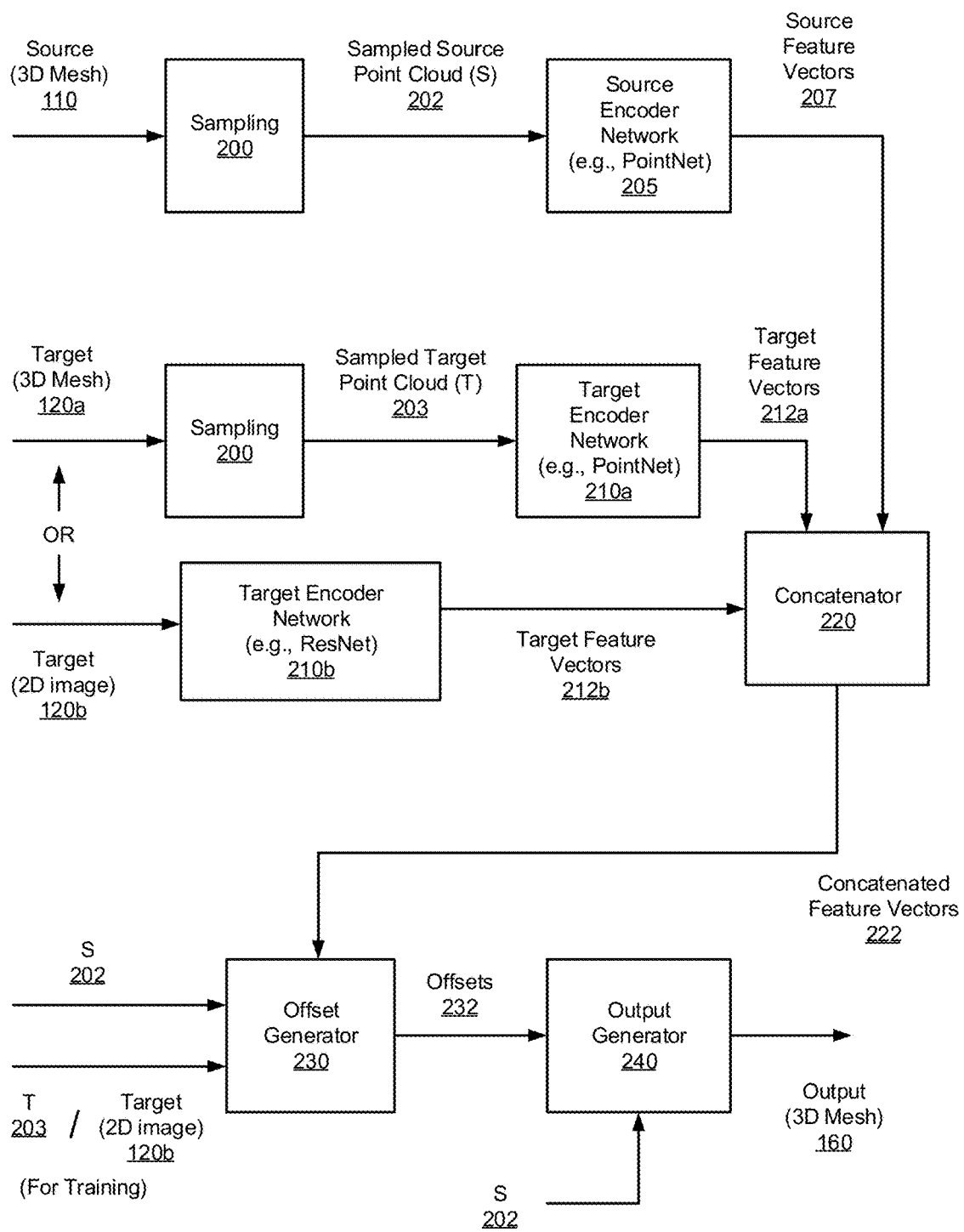
FIG. 2 is a block diagram of the deformation network, configured in accordance with an embodiment of the present disclosure.

FIG. 2 is a block diagram of the deformation network 100, configured in accordance with an embodiment of the present disclosure. As can be seen, the network 100 comprises a sampling module 200, a source encoder network 205, target encoder networks 210a and 210b, a concatenator module 220 an offset generator 230 and an output generator 240, the operations of which will be described in greater detail below.

Figure 5:
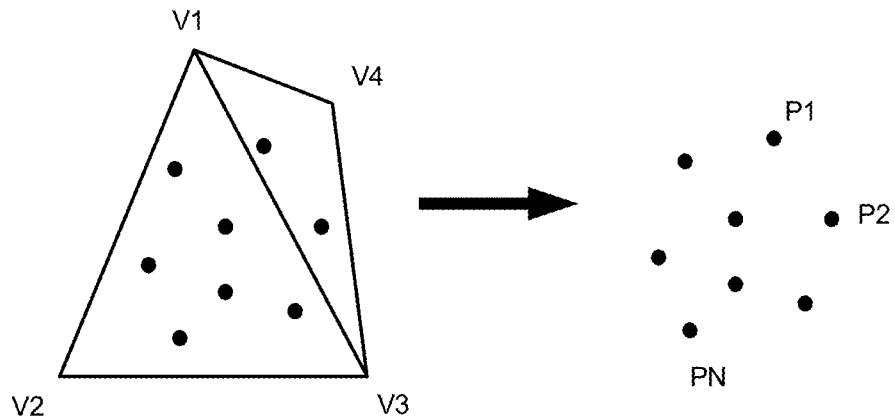
FIG. 5 illustrates a mesh and a sampled point cloud, in accordance with an embodiment of the present disclosure.
Figure 5:
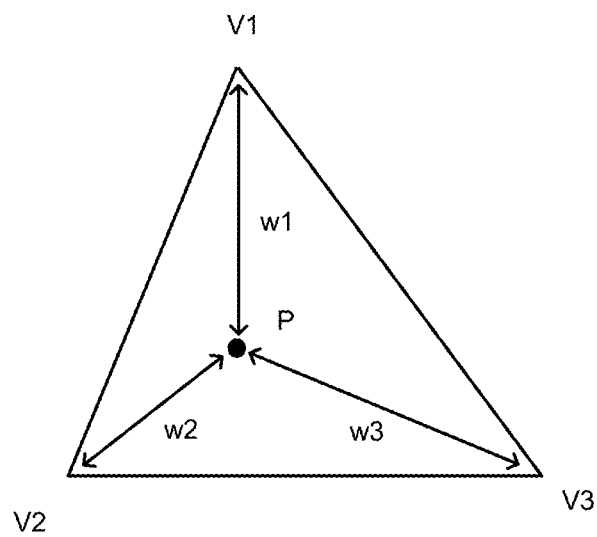

The sampling module 200 is configured to sample the source 3D mesh 110 representation of the source object to generate a sampled source point cloud (S) 202. The sampling module 200 is also configured, for those cases where the representation of the target object is also provided as a 3D mesh 120a, to sample the target 3D mesh 120a to generate sampled target point cloud (T) 203. FIG. 5 illustrates sample point clouds 202, 203 associated with the sampling of a mesh 110, 120, as will be described in greater detail below in connection with that figure.

The source encoder network 205 is configured to extract a set of one or more source feature vectors 207 from the sampled source point cloud (S) 202 associated with the source 3D mesh 110. The sampled source points of S 202 represent the source object, and the extraction of the set of source feature vectors is independent of the ordering of those source points. In some embodiments, the source encoder network 205 is a Deep Neural Network (DNN). In some embodiments, the DNN may be implemented using a PointNet network, or any other suitable, known DNN, in light of the present disclosure.

The target encoder network 210a is configured to extract a set of one or more target feature vectors 212a from the sampled target point cloud (T) 203 associated with the target 3D mesh 120a, for those cases in which the representation of the target object is provided as a 3D mesh. The sampled source points of T 203 represent the target object, and the extraction of the set of target feature vectors is independent of the ordering of those target points. In some embodiments, the target encoder network 210a is also a DNN and may be implemented using another instance of a PointNet network, or any other suitable, known DNN, in light of the present disclosure.

The target encoder network 210b is configured to extract a set of one or more target feature vectors 212b from a target 2D image 120b, for those cases in which the representation of the target object is provided as a 2D image. In some embodiments, the target encoder network 210b is a Convolutional Neural Network (CNN) which may be implemented using a 50-layer ResNet network, or any other suitable, known CNN, in light of the present disclosure.

The concatenator module 220 is configured to concatenate the source feature vectors 207 with the target feature vectors 212 to generate concatenated feature vectors 222 to be provided to the offset generator 230. The offset generator 230 is configured to generate or predict vertex offsets 232 based on the provided concatenated feature vectors 222. The operation of the offset generator 230 will be explained in greater detail below in connection with FIG. 3.

The output generator 240 is configured to generate an output 3D mesh 160 by applying the generated vertex offsets 232 to the sampled source point cloud (S) 202 to deform the source object representation to more closely resemble the target.

Figure 3:
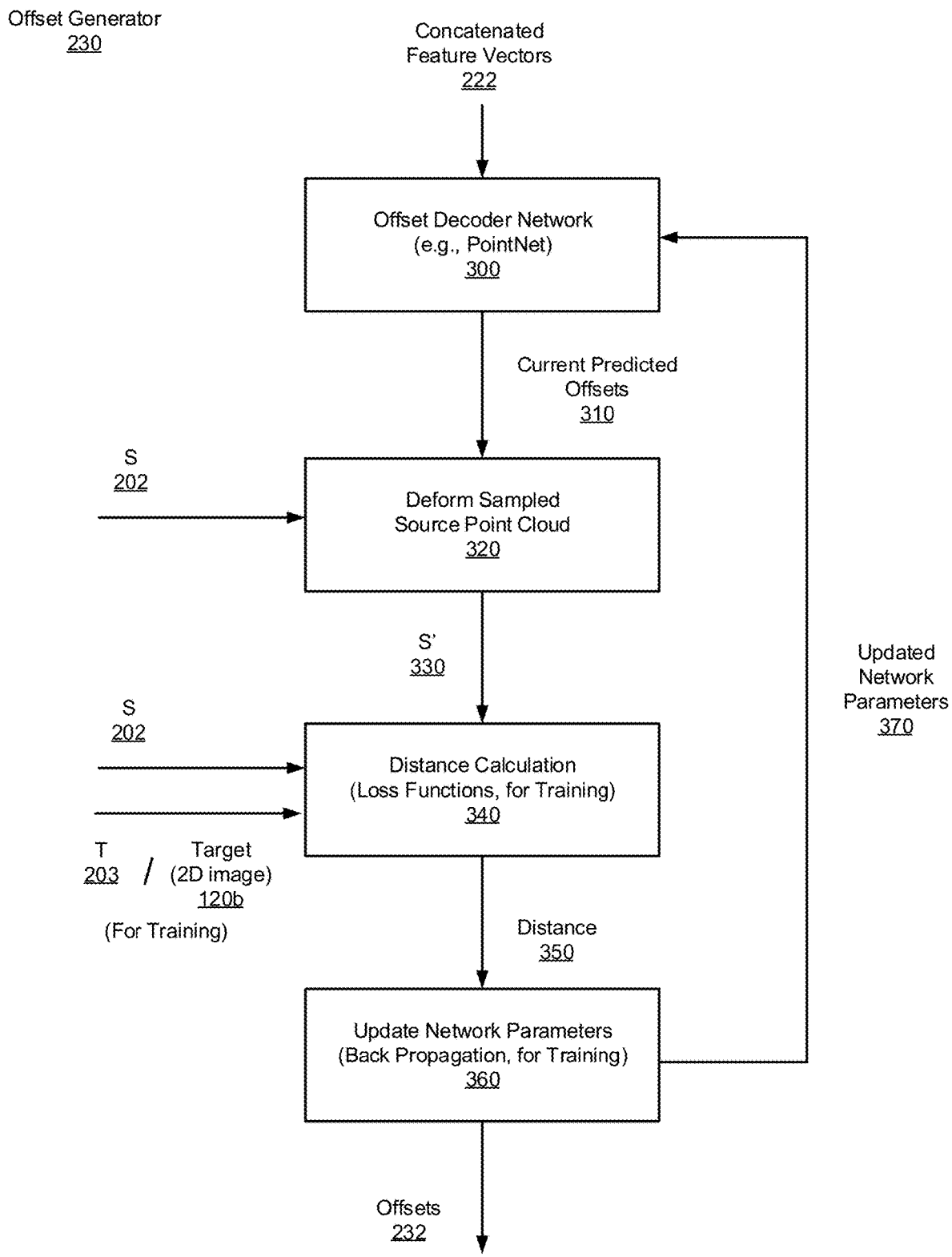
FIG. 3 is a more detailed block diagram of an offset generator, configured in accordance with an embodiment of the present disclosure.

FIG. 3 is a more detailed block diagram of the offset generator 230, configured in accordance with an embodiment of the present disclosure. The offset generator 230 is shown to include an offset decoder network 300, a sampled source point cloud deformation module 320, a distance calculation module 340, and a network parameter update module 360, the operations of which will be described in greater detail below.

The offset decoder network 300 is configured to decode the concatenated feature vectors 222 to predict vertex offsets for application to the source 3D mesh 110 to generate a deformed 3D mesh based on the target object. In some embodiments, the offset decoder network 300 is also a DNN and may be implemented using another instance of a PointNet network, or any other suitable, known DNN, in light of the present disclosure.

The sampled source point cloud deformation module 320 is configured to generate a deformed source point cloud S' 330 by applying (e.g., through vector addition) the current predicted offsets 310 to the sampled source point cloud (S) 202.

The distance calculation module 340 is configured to measure the suitability of the current S' 330 by evaluating a number of loss functions based on S 202, T 203, and Target 2D image 120b which are aggregated into a distance metric 350. The operation of the distance calculation module 340 is described in greater detail below in connection with FIG. 6.

The distance metric 350 is used (e.g., by network parameter update module 360) to generate updated network parameters 370 for back propagation to the offset decoder network 300 for the next iteration. This allows for unsupervised training of the offset decoder network 300. When the distance metric 350 reaches a satisfactory level, the current predicted offsets 310 are used as the generated offsets 232 for output by the offset generator 230. The loss function distance calculations 340 and back propagation parameter updates 360 are only performed during the unsupervised training, and thus the target data 203, 120b is not necessary during subsequent testing and operation of the network.

Figure 4:
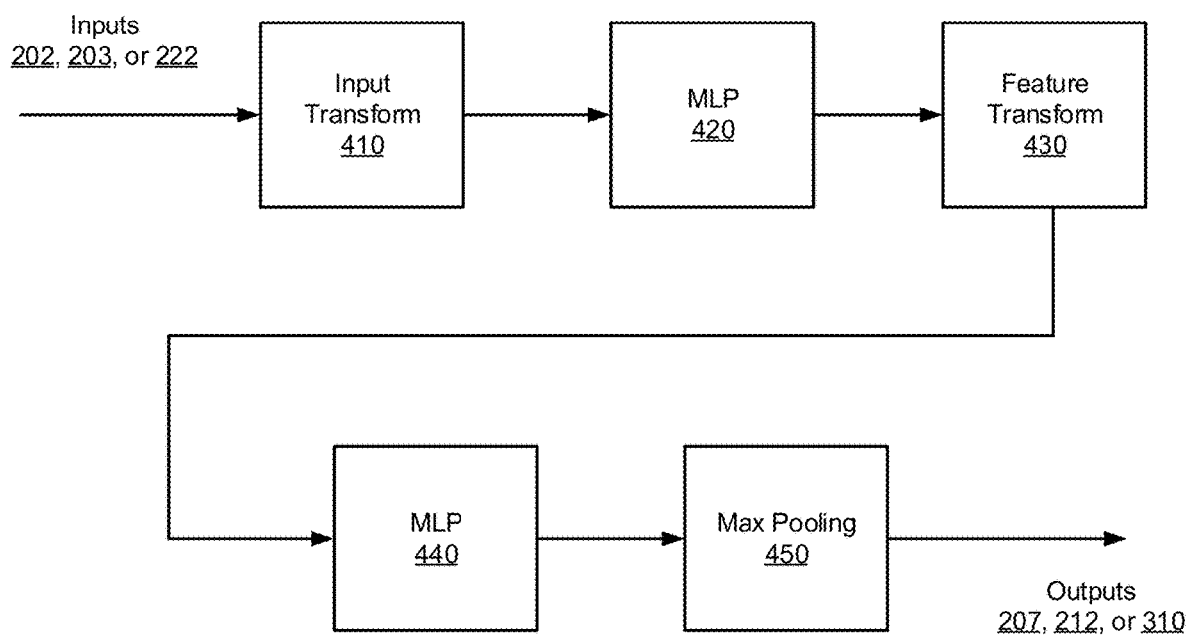
FIG. 4 is a block diagram of encoder and decoder networks, configured in accordance with an embodiment of the present disclosure.

FIG. 4 is a block diagram of encoder and decoder networks 205, 210a, and 300, configured in accordance with an embodiment of the present disclosure. The networks 205, 210a, and 300 are shown to include an input transformation layer 410, a first multilayer perceptron (MLP) 420, a feature transformation layer 430, a second MLP 440, and a max pooling layer 450, the operations of which will be described in greater detail below. In some embodiments, the networks 205, 210a, and 300 may be implemented using a PointNet network.

The input transformation layer 410 is configured to apply an affine transformation to the coordinates of the input points which are then provided to the first MLP 420. In some embodiments, the first MLP is configured with layer output sizes of 64×64. The feature transformation layer 430 is configured to align features between point clouds before passing those features on to the second MLP 440. In some embodiments, the second MLP 440 is configured with layer output sizes of 64, 128, and 1024. The max pooling layer 450 is configured to aggregate the features from the second MLP.

FIG. 5 illustrates a mesh 110, 120 and an associated sampled point cloud 202, 203, in accordance with an embodiment of the present disclosure. The mesh is comprised of interconnected triangular regions, in this example a first triangle with vertices $V_1$, $V_2$, and $V_3$, and a second triangle with vertices $V_1$, $V_3$, and $V_4$. The sampled point cloud comprises an array of points $P_1$, $P_2$, ... $P_N$. FIG. 5 also illustrates one example point P with enclosing vertices of one of the triangles. A weight value $\omega_{PV_i}$ may be assigned to each point/vertex pairing between point P and vertex $V_i$. In general, the weights are only calculated for the vertices of the enclosing triangle of the given point. In some embodiments, the weight value may be based on the distance between the point and the vertex. The features of interest (e.g., the deformation offsets generated by the decoder network) may be propagated from vertices to sample points by the following relationship:

$$F_P = \sum_{i \in \{1...3\}} \omega_{PV_i} F_{V_i}$$

where $F_{V_i}$ is the feature associated with vertex $V_i$ and $F_P$ is the feature associated with point P. The decoder network predicts per-vertex offsets but is able to compute losses at each sampled point, as described below.

Further, this relationship equation is differentiable, and thus may be incorporated into the learning process of the decoder DNN. Thus, for example, in some embodiments back propagation may be based on the partial derivative of the loss functions to the features according to the equation:

$$\frac{\partial L}{\partial F_{V_i}} = \omega_{PV_i} \frac{\partial L}{\partial F_P}$$

Figure 6:
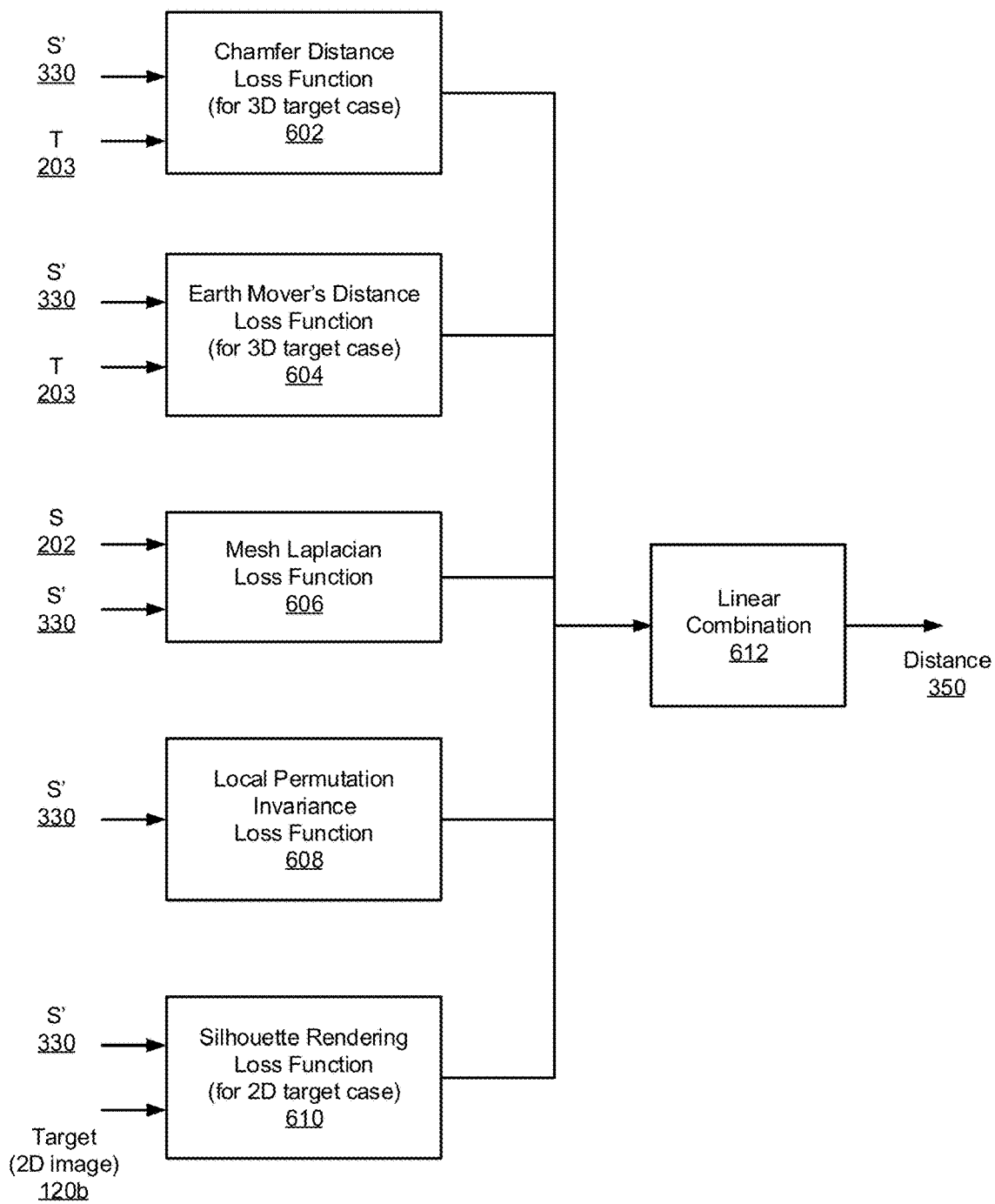
FIG. 6 is a more detailed block diagram of a distance calculation module, configured in accordance with an embodiment of the present disclosure.

FIG. 6 is a more detailed block diagram of the distance calculation module 340, configured in accordance with an embodiment of the present disclosure. The distance calculation module 340 is shown to include a Chamfer distance loss function module 602, and Earth Mover's distance loss function module 604, a mesh Laplacian loss function module 606, a local permutation invariance loss function module 608, a silhouette rendering loss function module 610, and a linear combination module 612, the operations of which will be described in greater detail below.

The Chamfer distance loss function module 602 is configured to minimize a distance between the deformed source S' 330 and the representation of the target object T 203. In one embodiment, this distance can be described by the following equation:

$$L_{CD}(S', T) = \sum_{p_1 \in S'} \min_{p_2 \in T} \|p_1 - p_2\|_2^2 + \sum_{p_2 \in T} \min_{p_1 \in S'} \|p_1 - p_2\|_2^2$$

where S' is the set of points in the deformed source point cloud and T is the set of points in the target mesh point cloud.

The Earth Mover's distance loss function module 604 is configured to minimize another distance between the deformed source S' 330 and the representation of the target object T 203. In one embodiment, this distance can be described by the following equation:

$$L_{EMD}(S', T) = \min_{\phi: T \to S'} \sum_{p \in T} \|p - \phi(p)\|_2$$

where S' is the set of points in the deformed source point cloud, T is the set of points in the target mesh point cloud, and $\phi(p)$ is a transformation function which maps target points to deformed source points.

The mesh Laplacian loss function module 606 is configured to calculate a loss between the source 3D mesh and the deformed 3D mesh to preserve details associated with the source 3D mesh. In one embodiment, this loss can be described by the following equation:

$$L_{lap} = \sum_i \|L(V_i) - L(D(V_i))\|_2$$

where L( ) is a mesh Laplacian operator, $V_i$ is the $i^{th}$ vertex in the source mesh, and $D(V_i)$ is the $i^{th}$ vertex in the deformed mesh.

Figure 7:
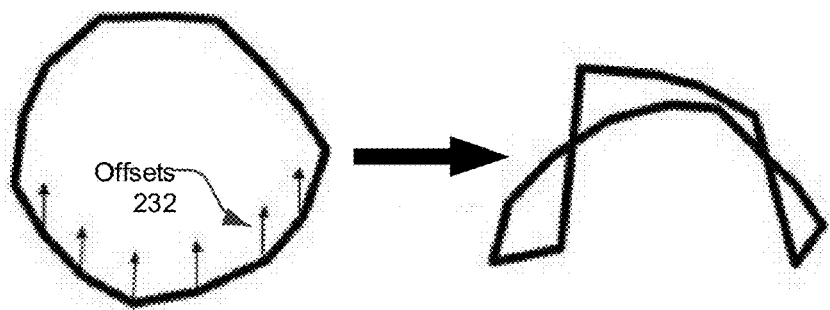
FIG. 7 illustrates avoidance of self-intersection in deformation, in accordance with an embodiment of the present disclosure.
Figure 7:
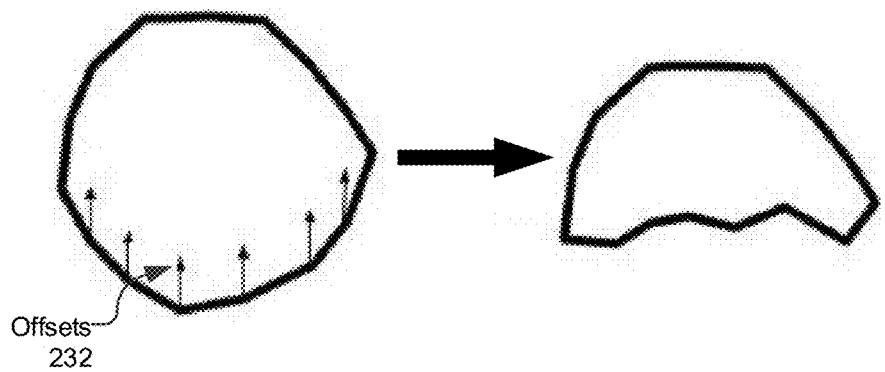

The local permutation invariance (LPI) loss function module 608 is configured to calculate a loss on the deformed 3D mesh S' to smooth the deformed 3D mesh and reduce instances of self-intersection of the deformed 3D mesh. When a 3D mesh is composed of relatively large triangles, the Laplacian loss defined above does not always ensure smoothness. Also, as shown in FIG. 7, mesh deformation using the losses defined above can generate offsets 232 that result in undesirable (e.g., unrealistic) self-intersections 702. The LPI serves to introduce smoothness in the mesh deformation at each sampled point. Specifically, given a set of sampled points P, a new set of points P' may be defined as P'=P+δ, by adding a small offset δ to each sampled point in one of the X, Y, and Z directions. The LPI loss function ensures that the distance between the deformed P and P' preserves the distance δ, and results in a deformed mesh 704 free of self-intersections. In one embodiment, this loss can be described by the following equation:

$$L_{LPI} = \sum_i \|D(P_i + \delta) - D(P_i)) - \delta\|_2$$

where D( ) represents the deformation operation.

The silhouette rendering loss function module 610 is configured to minimize a distance between the representation of the source object and a 2D representation of the target object. A silhouette of the deformed mesh is rendered from the same viewpoint as the target object, using known techniques in light of the present disclosure. In one embodiment, the rendering loss can be described by the following equation:

$$L_{rend} = \sum_i \|S_i - R(V_i, F, \pi_i)\|_2$$

Where $S_i$ represents the silhouette of the target and $R(V_i, F, \pi_i)$ represents the rendered silhouette for the 3D mesh with vertices $V_i$, face F, and camera parameters $\pi_i$.

The linear combination module 612 is configured to combine the outputs of the loss function modules with weighting factors selected to provide relative equalization or normalization between the various loss function calculations. The Chamfer distance loss function 602 and the Earth Mover's distance loss function 604 are only used in the case of a provided 3D target mesh. The silhouette rendering loss function 610 is only used in the case of a provided 2D target image.

Methodology

Figure 8:
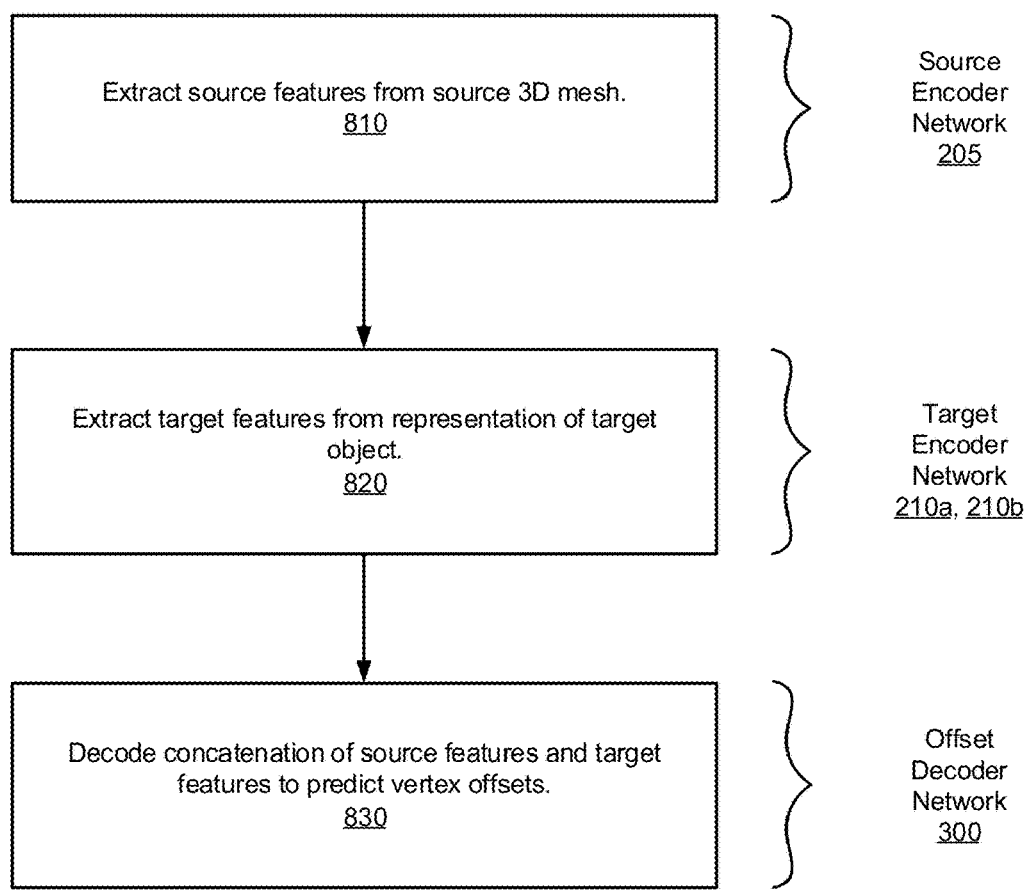
FIG. 8 is a flowchart illustrating a method for deforming a 3D mesh, in accordance with an embodiment of the present disclosure.

FIG. 8 is a flowchart 800 illustrating a method for deforming a 3D mesh, in accordance with an embodiment of the present disclosure. As can be seen, the method is described with reference to the configuration of source encoder network 205, target encoder network 210, and offset decoder network 300, of FIGS. 2 and 3. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 810, by extracting a set of source features from a source 3D mesh. As previously indicated, such a set may include one or more features or attributes of the source 3D mesh. In some embodiments, the source 3D mesh includes a plurality of source points representing a source object and the extraction of the set of source features is independent of the ordering of the source points. In some embodiments, the extraction is performed by a source encoder Deep Neural Network (DNN).

The method continues, at operation 820, by extracting a set of target features from a representation of a target object. As previously indicated, such a set may include one or more features or attributes of the target object. The target object representation may be a target 3D mesh or a target 2D image. If the target object representation is a target 3D mesh, the target mesh including a plurality of target points, then the extraction of target features may be performed by a target encoder DNN and the extraction is independent of the ordering of the target points. If the target object representation is a target 2D image, then the extracting of the set of target features may be performed by a Convolutional Neural Network (CNN).

At operation 830, a concatenation of the set of source features and the set of target features is decoded to predict vertex offsets for application to the source 3D mesh to generate a deformed 3D mesh based on the target object representation. In some embodiments, the decoding is performed by an offset decoder DNN.

In some embodiments, additional operations are performed. For example, in one embodiment, the decoding to predict vertex offsets includes calculating loss functions. A first set of loss functions are configured to minimize a distance between the representation of the source object and the representation of the target object. These loss functions may include, for example, a Chamfer distance function, an Earth Mover's distance function, and a Silhouette Rendering loss function. Additional loss functions may include a Local Permutation Invariant loss function to smooth the deformed 3D mesh and reduce instances of self-intersection of the deformed 3D mesh, and a Mesh Laplacian loss to preserve details associated with the source 3D mesh.

Example Platform

Figure 9:
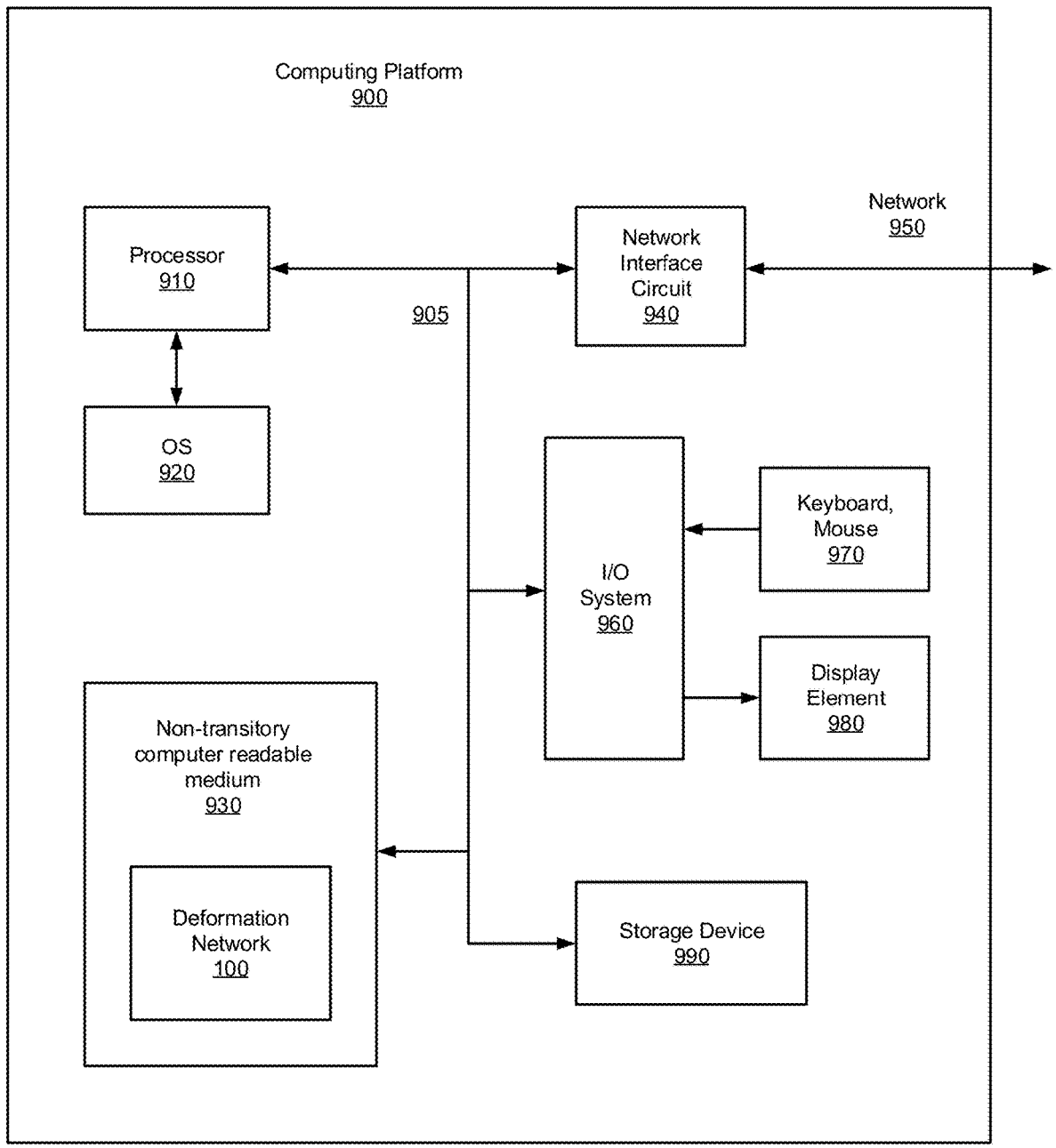
FIG. 9 is a block diagram schematically illustrating a computing platform configured to perform any of the techniques as variously described in this disclosure, configured in accordance with an embodiment of the present disclosure.

FIG. 9 is a block diagram schematically illustrating a computing platform 900 configured to perform any of the techniques as variously described in this disclosure, configured in accordance with an embodiment of the present disclosure. For example, in some embodiments, the deformation network 100 of FIG. 1, or any portions thereof, and the methodologies of FIG. 8, or any portions thereof, are implemented in the computing platform 900. In some embodiments, the computing platform 900 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing platform 900 includes one or more storage devices 990 and/or non-transitory computer-readable media 930 having encoded thereon one or more computer-executable instructions or software for implementing techniques as variously described in this disclosure. In some embodiments, the storage devices 990 includes a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 990 includes other types of memory as well, or combinations thereof. In one embodiment, the storage device 990 is provided on the computing platform 900. In another embodiment, the storage device 990 is provided separately or remotely from the computing platform 900. The non-transitory computer-readable media 930 include, but are not limited to, one or more types of hardware memory, non-transitory tangible media (for example, one or more magnetic storage disks, one or more optical disks, one or more USB flash drives), and the like. In some embodiments, the non-transitory computer-readable media 930 included in the computing platform 900 store computer-readable and computer-executable instructions or software for implementing various embodiments. In one embodiment, the computer-readable media 930 are provided on the computing platform 900. In another embodiment, the computer-readable media 930 are provided separately or remotely from the computing platform 900.

The computing platform 900 also includes at least one processor 910 for executing computer-readable and computer-executable instructions or software stored in the storage device 990 and/or non-transitory computer-readable media 930 and other programs for controlling system hardware. In some embodiments, virtualization is employed in the computing platform 900 so that infrastructure and resources in the computing platform 900 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 905 is also provided to allow for communication between the various components listed above and/or other components not shown. Computing platform 900 can be coupled to a network 950 (e.g., a local or wide area network such as the internet), through network interface circuit 940 to allow for communications with other computing devices, platforms, resources, clients, and Internet of Things (IoT) devices.

In some embodiments, a user interacts with the computing platform 900 through an input/output system 960 that interfaces with devices such as a keyboard and mouse 970 and/or a display element (screen/monitor) 980 which provides a user interface to accept user input and guidance, for example to configure or control the 3D structure generation. In some embodiments, the computing platform 900 includes other I/O devices (not shown) for receiving input from a user, for example, a pointing device or a touchpad, etc., or any suitable user interface. In some embodiments, the computing platform 900 includes other suitable conventional I/O peripherals. The computing platform 900 can include and/or be operatively coupled to various suitable devices for performing one or more of the aspects as variously described in this disclosure.

In some embodiments, the computing platform 900 runs an operating system (OS) 920, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 900 and performing the operations described in this disclosure. In one embodiment, the operating system runs on one or more cloud machine instances.

As will be appreciated in light of this disclosure, the various modules and components of the system, including the source encoder network 205, the target encoder network 210, the offset generator 230, the offset decoder network 300, the distance calculation modules 340, and the output generator 240 can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing platform 900, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 includes a method for deforming a 3-dimensional (3D) mesh, the method comprising: extracting, by a processor-based system, a set of one or more source features from a source 3D mesh, the source 3D mesh including a plurality of source points representing a source object, wherein the extracting of the set of source features is independent of an ordering of the source points; extracting, by the processor-based system, a set of one or more target features from a representation of a target object; and decoding, by the processor-based system, a concatenation of the set of source features and the set of target features, the decoding to predict vertex offsets for application to the source 3D mesh to generate a deformed 3D mesh based on the target object.

Example 2 includes the subject matter of Example 1, wherein the extracting of the set of source features is performed by a first instance of a Deep Neural Network (DNN), and the decoding to predict vertex offsets is performed by a second instance of the DNN.

Example 3 includes the subject matter of Examples 1 or 2, wherein the representation of the target object is a target 3D mesh including a plurality of target points, and the extracting of the set of target features is performed by a third instance of the DNN and the extraction is independent of an ordering of the target points.

Example 4 includes the subject matter of any of Examples 1-3, wherein the representation of the target object is a target 2-dimensional (2D) image, and the extracting of the set of target features is performed by a Convolutional Neural Network.

Example 5 includes the subject matter of any of Examples 1-4, wherein the decoding to predict vertex offsets includes calculating a loss function to minimize a distance between the representation of the source object and the representation of the target object, the loss function including at least one of a Chamfer distance function, an Earth Mover's distance function, and a Silhouette Rendering loss function.

Example 6 includes the subject matter of any of Examples 1-5, wherein the decoding to predict vertex offsets includes calculating a Local Permutation Invariant loss on the deformed 3D mesh to smooth the deformed 3D mesh and reduce instances of self-intersection of the deformed 3D mesh.

Example 7 includes the subject matter of any of Examples 1-6, wherein the decoding to predict vertex offsets includes calculating a Mesh Laplacian loss between the source 3D mesh and the deformed 3D mesh to preserve details associated with the source 3D mesh.

Example 8 is a system to deform a 3-dimensional (3D) mesh, the system comprising: one or more processors; a source encoder network module at least one of controllable and executable by the one or more processors, and configured to extract a set of one or more source features from a source 3D mesh, the source 3D mesh including a plurality of source points representing a source object, wherein the extracting of the set of source features is independent of an ordering of the source points; a target encoder network module at least one of controllable and executable by the one or more processors, and configured to extract a set of one or more target features from a representation of a target object; an offset decoder network module at least one of controllable and executable by the one or more processors, and configured to decode a concatenation of the set of source features and the set of target features, the decoding to predict vertex offsets for application to the source 3D mesh to generate a deformed 3D mesh based on the target object.

Example 9 includes the subject matter of Example 8, wherein the extracting of the set of source features is performed by a first instance of a Deep Neural Network (DNN), and the decoding to predict vertex offsets is performed by a second instance of the DNN.

Example 10 includes the subject matter of Examples 8 or 9, wherein the representation of the target object is a target 3D mesh including a plurality of target points, and the extracting of the set of target features is performed by a third instance of the DNN and the extraction is independent of an ordering of the target points.

Example 11 includes the subject matter of any of Examples 8-10, wherein the representation of the target object is a target 2-dimensional (2D) image, and the extracting of the set of target features is performed by a Convolutional Neural Network.

Example 12 includes the subject matter of any of Examples 8-11, further comprising a distance calculation module at least one of controllable and executable by the one or more processors, and configured to calculate a loss function to minimize a distance between the representation of the source object and the representation of the target object, the loss function including at least one of a Chamfer distance function, an Earth Mover's distance function, and a Silhouette Rendering loss function; and further configured to calculate a Mesh Laplacian loss between the source 3D mesh and the deformed 3D mesh to preserve details associated with the source 3D mesh.

Example 13 includes the subject matter of any of Examples 8-12, further comprising a distance calculation module at least one of controllable and executable by the one or more processors, and configured to calculate a Local Permutation Invariant loss on the deformed 3D mesh to smooth the deformed 3D mesh and reduce instances of self-intersection of the deformed 3D mesh.

Example 14 is a non-transitory computer program product having instructions encoded thereon that when executed by one or more computer processors cause the one or more computer processors to perform a process comprising: extracting a set of one or more source features from a source 3D mesh, the source 3D mesh including a plurality of source points representing a source object, wherein the extracting of the set of source features is independent of an ordering of the source points; extracting a set of one or more target features from a representation of a target object; and decoding a concatenation of the set of source features and the set of target features, the decoding to predict vertex offsets for application to the source 3D mesh to generate a deformed 3D mesh based on the target object.

Example 15 includes the subject matter of Example 14, wherein the extracting of the set of source features is performed by a first instance of a Deep Neural Network (DNN), and the decoding to predict vertex offsets is performed by a second instance of the DNN.

Example 16 includes the subject matter of Examples 14 or 15, wherein the representation of the target object is a target 3D mesh including a plurality of target points, and the extracting of the set of target features is performed by a third instance of the DNN and the extraction is independent of an ordering of the target points.

Example 17 includes the subject matter of any of Examples 14-16, wherein the representation of the target object is a target 2-dimensional (2D) image, and the extracting of the set of target features is performed by a Convolutional Neural Network.

Example 18 includes the subject matter of any of Examples 14-17, wherein the decoding to predict vertex offsets includes calculating a loss function to minimize a distance between the representation of the source object and the representation of the target object, the loss function including at least one of a Chamfer distance function, an Earth Mover's distance function, and a Silhouette Rendering loss function.

Example 19 includes the subject matter of any of Examples 14-18, wherein the decoding to predict vertex offsets includes calculating a Local Permutation Invariant loss on the deformed 3D mesh to smooth the deformed 3D mesh and reduce instances of self-intersection of the deformed 3D mesh.

Example 20 includes the subject matter of any of Examples 14-19, wherein the decoding to predict vertex offsets includes calculating a Mesh Laplacian loss between the source 3D mesh and the deformed 3D mesh to preserve details associated with the source 3D mesh.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for deforming a 3-dimensional (3D) mesh, the method comprising:
   extracting, by a processor-based system, a set of one or more source feature vectors from a source 3D mesh, the source 3D mesh including a plurality of source points representing a source object, wherein the extracting of the set of source feature vectors is independent of an ordering of the source points;
   extracting, by the processor-based system, a set of one or more target feature vectors from a representation of a target object; and
   decoding, by the processor-based system, a concatenation of the set of source feature vectors and the set of target feature vectors, the decoding to predict vertex offsets for application to the source 3D mesh to generate a deformed 3D mesh based on the target object.

2. The method of claim 1, wherein the extracting of the set of source feature vectors is performed by a first instance of a Deep Neural Network (DNN), and the decoding to predict vertex offsets is performed by a second instance of the DNN.

3. The method of claim 2, wherein the representation of the target object is a target 3D mesh including a plurality of target points, and the extracting of the set of target feature vectors is performed by a third instance of the DNN and the extracting of the set of target feature vectors is independent of an ordering of the target points.

4. The method of claim 2, wherein the representation of the target object is a target 2-dimensional (2D) image, and the extracting of the set of target feature vectors is performed by a Convolutional Neural Network.

5. The method of claim 1, wherein the decoding to predict vertex offsets includes calculating a loss function to minimize a distance between a representation of the source object and the representation of the target object, the loss function including at least one of a Chamfer distance function, an Earth Mover's distance function, and a Silhouette Rendering loss function.

6. The method of claim 1, wherein the decoding to predict vertex offsets includes calculating a Local Permutation Invariant loss on the deformed 3D mesh to smooth the deformed 3D mesh and reduce instances of self-intersection of the deformed 3D mesh.

7. The method of claim 1, wherein the decoding to predict vertex offsets includes calculating a Mesh Laplacian loss between the source 3D mesh and the deformed 3D mesh to preserve details associated with the source 3D mesh.

8. A system to deform a 3-dimensional (3D) mesh, the system comprising:
   one or more processors;
   a source encoder network module at least one of controllable and executable by the one or more processors, and configured to extract a set of one or more source features from a source 3D mesh, the source 3D mesh including a plurality of source points representing a source object, wherein the extracting of the set of source features is independent of an ordering of the source points;
   a target encoder network module at least one of controllable and executable by the one or more processors, and configured to extract a set of one or more target features from a representation of a target object;
   a concatenator module at least one of controllable and executable by the one or more processors, and configured to concatenate the set of source features and the set of target features, thereby generating a concatenated feature vector; and
   an offset decoder network module at least one of controllable and executable by the one or more processors, and configured to decode the concatenated feature vector to predict vertex offsets for application to the source 3D mesh to generate a deformed 3D mesh based on the target object.

9. The system of claim 8, wherein the extracting of the set of source features is performed by a first instance of a Deep Neural Network (DNN), and the decoding to predict vertex offsets is performed by a second instance of the DNN.

10. The system of claim 9, wherein the representation of the target object is a target 3D mesh including a plurality of target points, and the extracting of the set of target features is performed by a third instance of the DNN and the extraction is independent of an ordering of the target points.

11. The system of claim 9, wherein the representation of the target object is a target 2-dimensional (2D) image, and the extracting of the set of target features is performed by a Convolutional Neural Network.

12. The system of claim 8, further comprising a distance calculation module at least one of controllable and executable by the one or more processors, and configured to calculate a loss function to minimize a distance between a representation of the source object and the representation of the target object, the loss function including at least one of a Chamfer distance function, an Earth Mover's distance function, and a Silhouette Rendering loss function; and further configured to calculate a Mesh Laplacian loss between the source 3D mesh and the deformed 3D mesh to preserve details associated with the source 3D mesh.

13. The system of claim 8, further comprising a distance calculation module at least one of controllable and executable by the one or more processors, and configured to calculate a Local Permutation Invariant loss on the deformed 3D mesh to smooth the deformed 3D mesh and reduce instances of self-intersection of the deformed 3D mesh.

14. A non-transitory computer readable medium having instructions encoded thereon that when executed by one or more computer processors cause the one or more computer processors to perform a process comprising:
   extracting a set of one or more source feature vectors from a source 3D mesh, the source 3D mesh including a plurality of source points representing a source object, wherein the extracting of the set of source feature vectors is independent of an ordering of the source points;
   extracting a set of one or more target feature vectors from a representation of a target object; and
   decoding a concatenation of the set of source feature vectors and the set of target feature vectors, the decoding to predict vertex offsets for application to the source 3D mesh to generate a deformed 3D mesh based on the target object.

15. The non-transitory computer readable medium of claim 14, wherein the extracting of the set of source feature vectors is performed by a first instance of a Deep Neural Network (DNN), and the decoding to predict vertex offsets is performed by a second instance of the DNN.

16. The non-transitory computer readable medium of claim 15, wherein the representation of the target object is a target 3D mesh including a plurality of target points, and the extracting of the set of target feature vectors is performed by a third instance of the DNN and the extraction is independent of an ordering of the target points.

17. The non-transitory computer readable medium of claim 15, wherein the representation of the target object is a target 2-dimensional (2D) image, and the extracting of the set of target feature vectors is performed by a Convolutional Neural Network.

18. The non-transitory computer readable medium of claim 14, wherein the decoding to predict vertex offsets includes calculating a loss function to minimize a distance between a representation of the source object and the representation of the target object, the loss function including at least one of a Chamfer distance function, an Earth Mover's distance function, and a Silhouette Rendering loss function.

19. The non-transitory computer readable medium of claim 14, wherein the decoding to predict vertex offsets includes calculating a Local Permutation Invariant loss on the deformed 3D mesh to smooth the deformed 3D mesh and reduce instances of self-intersection of the deformed 3D mesh.

20. The non-transitory computer readable medium of claim 14, wherein the decoding to predict vertex offsets includes calculating a Mesh Laplacian loss between the source 3D mesh and the deformed 3D mesh to preserve details associated with the source 3D mesh.

* * * * *